US010804536B2

(12) United States Patent
Schimek et al.

(10) Patent No.: US 10,804,536 B2
(45) Date of Patent: Oct. 13, 2020

(54) SUBSTITUTED LAMBDA MANGANESE DIOXIDES IN AN ALKALINE ELECTROCHEMICAL CELL

(71) Applicant: Energizer Brands, LLC, St. Louis, MO (US)

(72) Inventors: George Louis Schimek, Seven Hills, OH (US); Robert M. Estanek, North Ridgeville, OH (US); Steven J. Limmer, Cleveland, OH (US); Guanghong Zheng, Westlake, OH (US)

(73) Assignee: Energizer Brands, LLC, St. Louis, MO (US)

(*) Notice: Subject to any disclaimer, the term of this patent is extended or adjusted under 35 U.S.C. 154(b) by 197 days.

(21) Appl. No.: 15/895,546

(22) Filed: Feb. 13, 2018

(65) Prior Publication Data

US 2018/0233743 A1 Aug. 16, 2018

Related U.S. Application Data

(60) Provisional application No. 62/458,345, filed on Feb. 13, 2017, provisional application No. 62/526,878, filed on Jun. 29, 2017.

(51) Int. Cl.
*H01M 4/505* (2010.01)
*H01M 6/04* (2006.01)
(Continued)

(52) U.S. Cl.
CPC ........ *H01M 4/505* (2013.01); *C01G 45/1228* (2013.01); *C01G 45/1242* (2013.01);
(Continued)

(58) Field of Classification Search
CPC .......... C01G 45/1228; C01G 45/1242; H01M 2220/30; H01M 2300/0014; H01M 4/42; H01M 4/505; H01M 6/045
See application file for complete search history.

(56) References Cited

U.S. PATENT DOCUMENTS 4,246,253 A 1/1981 Hunter
4,312,930 A 1/1982 Hunter
(Continued)

FOREIGN PATENT DOCUMENTS

CN 101719544 * 11/2009
JP 08031456 A * 2/1996
(Continued)

OTHER PUBLICATIONS

Duttine et al., "Tailoring the Composition of a Mixed Anion Iron-Based Sluoride Compound: Evidence for Anionic Vacancy and Electrochemical Performance in Lithium Cells," Chemistry of Materials, 2014, vol. 26, pp. 4190-4199.
(Continued)

*Primary Examiner* — Basia A Ridley
*Assistant Examiner* — Heng M. Chan
(74) *Attorney, Agent, or Firm* — Alston & Bird LLP

(57) ABSTRACT

Substituted $\lambda$-$MnO_2$ compounds are provided, where a portion of the Mn is replaced by at least one alternative element. Electrochemical cells incorporating substituted $\lambda$-$MnO_2$ into the cathode, as well as methods of preparing the substituted $\lambda$-$MnO_2$, are also provided.

17 Claims, 4 Drawing Sheets

(51) Int. Cl.
*H01M 4/42* (2006.01)
*C01G 45/12* (2006.01)

(52) U.S. Cl.
CPC ............ *H01M 4/42* (2013.01); *H01M 6/045* (2013.01); *C01P 2002/72* (2013.01); *C01P 2006/40* (2013.01); *H01M 2220/30* (2013.01); *H01M 2300/0014* (2013.01)

(56) References Cited

U.S. PATENT DOCUMENTS

| | | | |
|---|---|---|---|
| 5,866,279 A * | 2/1999 | Wada | C01G 45/1242 423/599 |
| 6,524,750 B1 | 2/2003 | Mansuetto | |
| 6,783,893 B2 | 8/2004 | Bowden et al. | |
| 8,722,246 B2 | 5/2014 | Manthiram et al. | |

FOREIGN PATENT DOCUMENTS

| | | | | |
|---|---|---|---|---|
| JP | 2005100944 A | * | 4/2005 | |
| JP | 2007123149 A | * | 5/2007 | |
| JP | 2008218105 A | * | 9/2008 | |

OTHER PUBLICATIONS

Sun, Y., et al., "Overcoming Jahn-Teller Distortion for Spinel Mn Phase," Electrochemical and Solid-State Letters, 2000, vol. 3, No. 1, pp. 7-9.
Wickham, D.G., et al., "Crystallographic and magnetic properties of several spinels containing trivalent ja-1044 manganese," Journal of Physics and Chemistry Solids, Dec. 1958, vol. 7, No. 4, p. 351-360.

* cited by examiner

SUBSTITUTED LAMBDA MANGANESE DIOXIDES IN AN ALKALINE ELECTROCHEMICAL CELL

CROSS-REFERENCE TO RELATED APPLICATIONS

This application claims priority of U.S. Provisional Application Nos. 62/458,345, filed Feb. 13, 2017, and 62/526,878, filed Jun. 29, 2017, the contents of each of which are hereby incorporated in reference herein in their entireties.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

Manganese dioxide ($MnO_2$) is a well-known substance commonly used in electrochemical cells, such as dry cell batteries, as an active cathode material. Manganese dioxide has been known to exist in various crystalline forms among which pyrolusite and nsutite are commonly found in nature. Ramsdellite is also found in nature, but to a lesser extent.

$LiMn_2O_4$, a spinel, is reported by Wickham and Croft (D. G. Wickham & W. J. Croft, J. Phys. Chem. Solids, 7, 351 (1958)) to form whenever lithium carbonate and any oxide of manganese are taken in a 2:1 molar ratio of Mn/Li, and heated at 800°-900° C. in air. The product $LiMn_2O_4$ (a blue colored material) contains equal amounts of Mn(III) and Mn(IV), and accordingly has a manganese peroxidation value of 75% (% peroxidation is defined as the degree to which the manganese oxidation state has been raised from Mn(II) to Mn(IV). Thus, MnO has 0% peroxidation and $MnO_2$ has 100% peroxidation). Wickham and Croft also reported that using excess Li in the reaction led to formation of a mixture of $LiMn_2O_4$ and $Li_2MnO_3$ (a red material), while excess Mn led to a mixture containing $Mn_2O_3$ in addition to the $LiMn_2O_4$. It should be noted that other preparative techniques are possible for preparing $LiMn_2O_4$, in addition to those described by Wickham and Croft. Other lithium or manganese compounds can be used as starting materials provided they decompose to lithium or manganese oxides under the reaction conditions used.

U.S. Pat. Nos. 4,246,253 and 4,312,930 relate to a purportedly new form of manganese dioxide and a method of preparing it. The manganese dioxide, made by acid treatment of $LiMn_2O_4$, is referred to as $\lambda\text{-}Mn_2O_4$ and is purportedly "a substantially pure $MnO_2$ whose x-ray pattern is nearly identical to that of the starting material, $LiMn_2O_4$, a spinel."

U.S. Pat. No. 6,783,893 relates to alkaline batteries having a cathode including lambda-manganese dioxide cathode, an anode comprising zinc, a separator between the cathode and the anode, and an alkaline electrolyte contacting the anode and the cathode, where the lambda-manganese dioxide cathode material has certain discharge capacity characteristics.

Efforts have been made to produce batteries which have more actives (i.e. Zn and $MnO_2$) and/or less inactives in the electrochemical cell. It is in an effort to overcome the limitations of the above-described cells, and other such cells, that the present embodiments were designed.

BRIEF SUMMARY

An embodiment is substituted $\lambda\text{-}MnO_2$, having at least one alternate element substituted for a portion of the Mn.

An embodiment is a primary alkaline electrochemical cell comprising a cathode comprising the substituted $\lambda\text{-}MnO_2$, wherein the substituted $\lambda\text{-}MnO_2$ comprises two alternate elements, and wherein the electrochemical cell exhibits a synergistic improvement in specific capacity or run-time compared to an electrochemical cell comprising a cathode comprising unsubstituted $\lambda\text{-}MnO_2$.

An embodiment is a primary alkaline electrochemical cell, comprising:
 a) a container; and
 b) an electrode assembly disposed within the container and comprising a positive electrode, a negative electrode, a separator located between the positive electrode and the negative electrode, and an alkaline electrolyte,
  wherein the negative electrode comprises zinc, and
  wherein the positive electrode comprises the embodiments of the substituted $\lambda\text{-}MnO_2$ described above.

An embodiment is a method of producing a substituted $\lambda\text{-}MnO_2$, comprising the step of suspending a composition having the chemical formula $(Li_{1-v}A_v)(Mn_{2-2x}M_{2x})O_{4-w}AS_t$ in aqueous sulfuric acid, so as to produce a substituted $\lambda\text{-}MnO_2$ having the formula $(Li_{1-v}A_v)_z(Mn_{1-x}M_x)O_{2-(w/2)}AS_{(t/2)}$, wherein $0<x\leq0.5$, $v\leq0.1$, $z\leq0.05$, and $t\leq w\leq0.2$; and wherein M is selected from the group consisting of Al, B, Co, Cr, Cu, Fe, Ga, Li, Nb, Ni, Mg, Ru, Ti, V, and Zn, A is selected from the group consisting of Na, K, Rb, and Cs, and wherein AS is S, F, N, or any element that can be isoelectronic to $O^{2-}$.

An embodiment is a method of producing a substituted $\lambda\text{-}MnO_2$, comprising the step of suspending a composition having the chemical formula $(Li_{1-v}A_v)(Mn_{2-2x-2y}M1_{2x}M2_{2y})O_{4-w}AS_t$ in aqueous sulfuric acid, so as to produce a substituted $\lambda\text{-}MnO_2$ having the formula $(Li_{1-v}A_v)_z(Mn_{1-x-y}M1_xM2_y)O_{2-(w/2)}AS_{(t/2)}$, wherein $0<(x+y)\leq0.5$, $v\leq0.1$, $z\leq0.05$, and $t\leq w\leq0.2$; and wherein M1 and M2 are different from each other and are each selected from the group consisting of Al, B, Co, Cr, Cu, Fe, Ga, Li, Nb, Ni, Mg, Ru, Ti, V, and Zn, A is selected from the group consisting of Na, K, Rb, and Cs, and wherein AS is S, F, N, or any element that can be isoelectronic to $O^{2-}$.

DETAILED DESCRIPTION AND DISCUSSION

Figure 1:
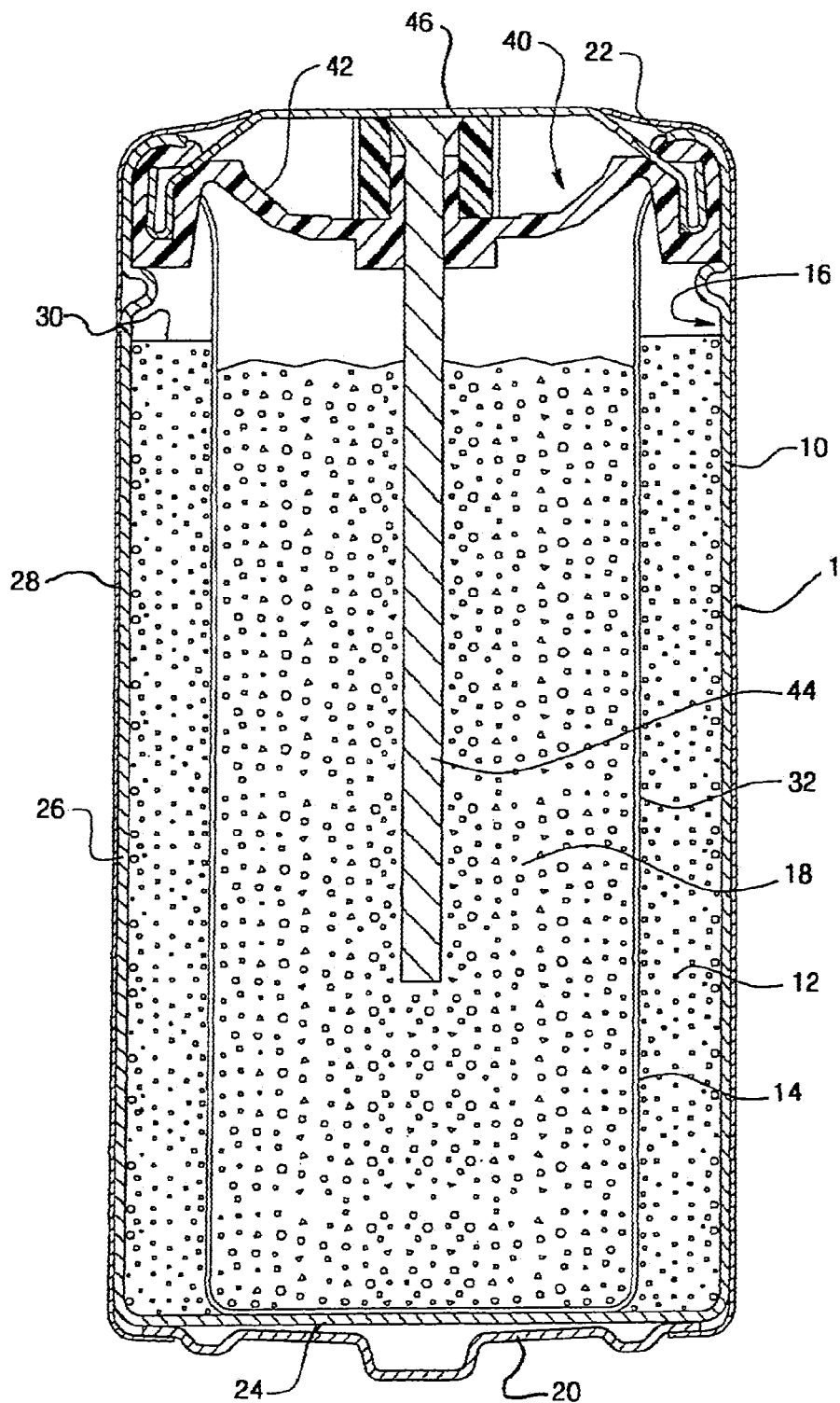
FIG. 1 is a cross-sectional elevational view of an alkaline electrochemical cell of an embodiment.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within ±10% of the numerical value or range recited or claimed.

As used herein, "synergistic," in terms of an effect, refers to the case where a substituted λ-$MnO_2$ comprising two alternate elements (M1 and M2) exhibits a greater improvement in specific capacity, or some other property or metric of performance, compared to unsubstituted λ-$MnO_2$, than would be expected based on the improvements exhibited by two substituted λ-$MnO_2$ s, one comprising M1 and one comprising M2.

As used herein, "improvement" with respect to specific capacity means that the specific capacity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, etc.).

As used herein, "alternate element" (sometimes shortened to "element") or "manganese substituent" refers to an element substituted for a portion of the Mn in a substituted λ-$MnO_2$, as well as during the manufacture and use thereof. Where the alternate element may be a metalloid, this refers to the group including the elements B, Si, Ge, As, Sb, Te, Po, At, Se, and C.

As used herein, when two species are "isoelectronic" to each other, they have the same number of valence electrons. As examples, $S^{2-}$, $F^-$, and $N^{3-}$ are all isoelectronic to $O^{2-}$ and to each other. Thus, the elements S, F, and N may be isoelectronic to $O^{2-}$.

As used herein, "specific capacity" refers to the total amount of charge in an electrochemical cell when discharged at a particular rate. This is typically measured in ampere hours.

As used herein, "run-time" refers to the length of time that an electrochemical cell will be able to provide a certain level of charge.

For chemical formulas comprising a component having a subscript of 0, it will be understood that that component is not present in the formula. For example, in the formula $(Mn_{1-x}M_x)O_{2-w}AS_t$, where t=0, AS is not present.

An embodiment is substituted λ-$MnO_2$, having at least one alternate element substituted for a portion of the Mn. In an embodiment, the substituted λ-$MnO_2$ has a formula of $(Mn_{1-x}M_x)O_2$, wherein $0<x\leq0.5$. In an embodiment, the alternate element is a metallic element. In an embodiment, the alternate element is a metalloid.

In an embodiment, the substituted λ-$MnO_2$ comprises oxygen vacancies. In an embodiment, the substituted λ-$MnO_2$ comprising oxygen vacancies has a formula of $(Mn_{1-x}M_x)O_{2-w}$, wherein $0<x\leq0.5$ and $0<w\leq0.2$.

In an embodiment, the substituted λ-$MnO_2$ is anion-substituted. In an embodiment, the anion-substituted λ-$MnO_2$ has a formula of $(Mn_{1-x}M_x)O_{2-w}AS_t$, wherein $0<x\leq0.5$, $0<t=w\leq0.2$, and AS is S, F, N, or any element that can be isoelectronic to $O^{2-}$. See U.S. Pat. No. 8,722,246, which is hereby incorporated by reference in its entirety.

In an embodiment, the substituted λ-$MnO_2$ comprises oxygen vacancies and is anion-substituted. In an embodiment, the substituted λ-$MnO_2$ comprising oxygen vacancies and that is anion-substituted has a formula of $(Mn_{1-x}M_x)O_{2-w}AS_t$, wherein $0<x\leq0.5$, $0<t<w\leq0.2$, and AS is S, F, N, or any element that can be isoelectronic to $O^{2-}$. See Duttine et al., "Tailoring the Composition of a Mixed Anion Iron-Based Fluoride Compound: Evidence for Anionic Vacancy and Electrochemical Performance in Lithium Cells," *Chemistry of Materials* 26:4190-4199 (2014), which is hereby incorporated by reference in its entirety.

In an embodiment, the substituted λ-$MnO_2$ retains residual lithium from its precursor composition. In an embodiment, the substituted λ-$MnO_2$ retaining residual lithium from its precursor composition has a formula of $Li_z(Mn_{1-x}M_x)O_2$, wherein $0<x\leq0.5$ and $0<z\leq0.10$. In a further embodiment, a portion of the residual lithium is substituted by an alkali metal A. In an embodiment, the substituted λ-$MnO_2$ comprises residual lithium, wherein a portion of the residual lithium is substituted by an alkali metal A, and has a formula of $(Li_{1-v}A_v)_z(Mn_{1-x}M_x)O_2$, wherein $0<x\leq0.5$, $0<v\leq0.1$, and $0<z\leq0.10$. The primary cation before removal would be Li.

In an embodiment, the substituted λ-$MnO_2$ has the formula $(Li_{1-v}A_v)_z(Mn_{1-x}M_x)O_{2-(w/2)}AS_{(t/2)}$, wherein $0<x\leq0.5$ and v≤0.1 and z≤0.10 and t≤w≤0.2, and wherein M is the alternate element, A is an alkali metal, and AS is S, F, N, or any element that can be isoelectronic to $O^{2-}$. In an alternate embodiment, the substituted λ-$MnO_2$ has the formula $(Li_{1-v}A_v)_z(Mn_{1-x-y}M1_xM2_y)O_{2-(w/2)}AS_{(t/2)}$, wherein $0<(x+y)≤0.5$ and v≤0.1 and z≤0.10 and t≤w≤0.2, and wherein M1 and M2 are each an alternate element, and M1 is different from M2, A is an alkali metal, and AS is S, F, N, or any element that can be isoelectronic to $O^{2-}$. In further embodiments, z≤0.05. In an alternate embodiment, the substituted λ-$MnO_2$ has 3 or more alternate elements substituted for portions of the Mn. In embodiments where z is 0, there is no residual lithium in the substituted λ-$MnO_2$. In embodiments where z is greater than 0, and v is 0, there is no residual alkali metal in the substituted λ-$MnO_2$. In embodiments where w is 0, there are no oxygen vacancies in the substituted λ-$MnO_2$. In embodiments where w is greater than 0, and t is 0, there is no anion substitution.

In an embodiment, each alternate element is selected from the group consisting of Al, B, Co, Cr, Cu, Fe, Ga, Li, Nb, Ni, Mg, Ru, Ti, V, and Zn, and A is selected from the group consisting of Na, K, Rb, and Cs.

In an embodiment, the spinel precursor of the substituted λ-$MnO_2$ is over-lithiated. In an embodiment, the over-lithiated spinel precursor has a formula of $Li(Mn_{2-x}Li_x)O_{4-2x}$ or $Li(Mn_{2-x}Li_x)O_{4-x}$, wherein $0<x≤0.2$. To maintain charge neutrality, oxygen vacancies are required.

In an embodiment, each alternate element can exist in an octahedral coordination environment of oxygen, supports M-O bonds of about 1.8 to 2.2 Å, and has an oxidation state that allows charge neutrality of the λ-$MnO_2$.

An embodiment is a primary alkaline electrochemical cell comprising a cathode comprising the substituted λ-$MnO_2$, wherein the substituted λ-$MnO_2$ comprises two alternate elements, and wherein the electrochemical cell exhibits a synergistic improvement in specific capacity or run-time compared to an electrochemical cell comprising a cathode comprising unsubstituted λ-$MnO_2$.

An embodiment is a primary alkaline electrochemical cell, comprising:
 a) a container; and
 b) an electrode assembly disposed within the container and comprising a positive electrode, a negative electrode, a separator located between the positive electrode and the negative electrode, and an alkaline electrolyte,
  wherein the negative electrode comprises zinc, and
  wherein the positive electrode comprises the embodiments of the substituted λ-$MnO_2$ described above.

In a further embodiment, the specific capacity or run-time is greater than that of a similar primary alkaline electrochemical cell comprising unsubstituted λ-$MnO_2$ or EMD in its positive electrode. In a further embodiment, the specific capacity or run-time is from ≥1% greater to ≥32% greater, or from ≥5% greater to ≥25% greater, or from ≥10% greater to ≥20% greater.

In an embodiment, the specific capacity is between 267-359 (mAh/g to 0.9V), or between 285-350 (mAh/g to 0.9V), or between 295-340 (mAh/g to 0.9V), or between 305-335 (mAh/g to 0.9V), or between 315-330 (mAh/g to 0.9V), or between 320-325 (mAh/g to 0.9V).

An embodiment is a method of producing a substituted λ-$MnO_2$, comprising the step of suspending a composition having the chemical formula $(Li_{1-v}A_v)(Mn_{2-2x}M_{2x})O_{4-w}AS_t$ in aqueous sulfuric acid, so as to produce a substituted λ-$MnO_2$ having the formula $(Li_{1-v}A_v)_z(Mn_{1-x}M_x)O_{2-(w/2)}AS_{(t/2)}$, wherein $0<x≤0.5$, v≤0.1, z≤0.05, and t<w≤0.2; and wherein M is selected from the group consisting of Al, B, Co, Cr, Cu, Fe, Ga, Li, Nb, Ni, Mg, Ru, Ti, V, and Zn, A is selected from the group consisting of Na, K, Rb, and Cs, and AS is S, F, N, or any element that can be isoelectronic to $O_{2-}$. In a further embodiment, the method comprises a step of producing the $(Li_{1-v}A_v)(Mn_{2-2x}M_{2x})O_{4-w}AS_t$ by reacting $Li_2CO_3$, $A_2CO_3$, $Mn_2O_3$, $O_2$, a compound comprising M, and a compound comprising AS in appropriate stoichiometric ratios, at about 850° C. In an embodiment, the $Li_2CO_3$, $A_2CO_3$ if A is present, $Mn_2O_3$, $O_2$, the compound comprising M, and the compound comprising AS if AS is present are reacted for about 16 hours.

An embodiment is a method of producing a substituted λ-$MnO_2$, comprising the step of suspending a composition having the chemical formula $(Li_{1-v}A_v)(Mn_{2-2x-2y}M1_{2x}M2_{2y})O_{4-w}AS_t$ in aqueous sulfuric acid, so as to produce a substituted λ-$MnO_2$ having the formula $(Li_{1-v}A_v)_z(Mn_{1-x-y}M1_xM2_y)O_{2-(w/2)}AS_{(t/2)}$, wherein $0<(x+y)≤0.5$, v≤0.1, z≤0.05, and t≤w≤0.2 and wherein M1 and M2 are different from each other and are each selected from the group consisting of Al, B, Co, Cr, Cu, Fe, Ga, Li, Nb, Ni, Mg, Ru, Ti, V, and Zn, A is selected from the group consisting of Na, K, Rb, and Cs, and AS is selected from the group consisting of S, F, and N.

In a further embodiment, the method comprises a step of producing the $(Li_{1-v}A_v)(Mn_{2-2x-2y}M1_{2x}M2_{2y})O_{4-w}AS_t$ by reacting $Li_2CO_3$, $A_2CO_3$ if A is present, $Mn_2O_3$, $O_2$, a compound comprising M1, a compound comprising M2, and a compound comprising AS if AS is present in appropriate stoichiometric ratios, at about 850° C. In an embodiment, the $Li_2CO_3$, $A_2CO_3$ if A is present, $Mn_2O_3$, $O_2$, the compound comprising M1, the compound comprising M2, and the compound comprising AS if AS is present are reacted for about 16 hours.

In a further embodiment, the composition is suspended in the sulfuric acid for at least 5, at least 6, at least 7, at least 8, at least 9, at least 10, at least 11, at least 12, at least 13, at least 14, at least 15, or at least 16 hours.

In an embodiment, the composition is suspended in the sulfuric acid for about 16 hours.

In an embodiment, the sulfuric acid concentration is 1.0-18 M sulfuric acid. In an embodiment, the sulfuric acid concentration is 2.5 M. In an embodiment, the sulfuric acid is at a temperature over 90° C., over 91° C., over 92° C., over 93° C., over 94° C., over 95° C., over 96° C., over 97° C., over 98° C., or over 99° C. In an embodiment, the sulfuric acid is at about 99° C. In an embodiment, the sulfuric acid is at a temperature between 99° C.-105° C.

An embodiment is a substituted λ-$MnO_2$ produced by any of the above methods.

An embodiment is a primary alkaline electrochemical cell, comprising:
 a) a container; and
 b) an electrode assembly disposed within the container and comprising a positive electrode, a negative electrode, a separator located between the positive electrode and the negative electrode, and an alkaline electrolyte,
  wherein the positive electrode comprises substituted λ-$MnO_2$ produced by any of the above methods.

An embodiment is a primary alkaline electrochemical cell described above, wherein during discharge, formation of Birnessite is delayed, reduced, or eliminated compared to the formation of Birnessite during discharge of a similar primary alkaline electrochemical cell comprising unsubstituted λ-$MnO_2$ or EMD in its positive electrode. In an embodiment, the formation of Birnessite is reduced by at least 1%, at least 5%, at least 10%, at least 15%, at least 20%, at least 25%, at least 40%, at least 35%, at least 40%, at least 45%, at least 50%, at least 55%, at least 60%, at least 65%, at least 70%, at least 75%, at least 80%, at least 85%, at least 90%, at least 95%, or at least 99%. In an embodiment, the formation of Birnessite is reduced by 1-99%.

In an embodiment, the alternate element is a Period 2 element on the periodic table. In another embodiment, the alternate element is a Period 3 element on the periodic table. In another embodiment, the alternate element is a Period 4 element on the periodic table. In another embodiment, the alternate element is a Period 5 element on the periodic table. In another embodiment, the alternate element is a Period 6 element on the periodic table.

In an embodiment, the alternate element is a Group 1 element on the periodic table. In another embodiment, the alternate element is a Group 2 element on the periodic table. In another embodiment, the alternate element is a Group 3 element on the periodic table. In another embodiment, the alternate element is a Group 4 element on the periodic table. In another embodiment, the alternate element is a Group 5 element on the periodic table. In another embodiment, the alternate element is a Group 6 element on the periodic table. In another embodiment, the alternate element is a Group 7 element on the periodic table. In another embodiment, the alternate element is a Group 8 element on the periodic table. In another embodiment, the alternate element is a Group 9 element on the periodic table. In another embodiment, the alternate element is a Group 10 element on the periodic table. In another embodiment, the alternate element is a Group 11 element on the periodic table. In another embodiment, the alternate element is a Group 12 element on the periodic table. In another embodiment, the alternate element is a Group 13 element on the periodic table. In another embodiment, the alternate element is a Group 14 element on the periodic table. In another embodiment, the alternate element is a Group 15 element on the periodic table.

Electrolytic manganese dioxide (EMD) is the most common phase used as the cathode active material in alkaline Zn/MnO$_2$ batteries. It exhibits good discharge characteristics during the homogeneous reduction of MnO$_2$ (EMD) to MnOOH. As the proportion of MnOOH in the cathode approaches 100%, it becomes more soluble in the electrolyte and the Mn$^{+3}$ concentration in solution rises. In a battery there is also zinc (e.g., within the anode), in the discharged form of zincate, Zn(OH)$_4^{2-}$. These two species (zincate and Mn$^{+3}$) react to form the inert compound hetaerolite, ZnMn$_2$O$_4$, which precipitates, essentially stopping any further electrochemical activity for that manganese, which could otherwise produce another electron discharge and be further reduced (to Mn$^{+2}$). Battery life (run-time) could be extended, especially for low drain applications, if the hetaerolite reaction could be slowed or eliminated. Another benefit to extending the discharge life/run-time could be the lessening or elimination of leakage associated with deep discharge of batteries by providing more reducible Mn, thus enabling a higher discharge of the anode active material.

Alternate forms of MnO$_2$ may provide more than one electron discharge and thus greater capacity/run-time. λ-MnO$_2$, where a portion of the Mn is substituted with one or more alternate elements at various levels (substituted λ-MnO$_2$), results in a material that has longer run-time and greater stability in KOH electrolyte. In principle, all elements that can exist in an octahedral coordination environment of oxygen, support M-O bonds of about 1.8 to 2.2 Å, and have an oxidation state that allows charge neutrality of the spinel, could feasibly be incorporated into the structure.

Given the general substituted λ formulation (Mn$_{1-x}$M$_x$)O$_2$, where M is the alternate element, the alternate element may be, but is not limited to, Al, B, Co, Cr, Cu, Fe, Ga, Li, Nb, Ni, Mg, Ru, Ti, V, or Zn. The alternate element may be inert (such as Al, B, Cr, Ga, Li, Mg, or Ti) or potentially electroactive (such as Co, Cu, Fe, Ni, Ru, V, or Zn). In a preferred embodiment, the alternate element is Ti. The concentration, x, of alternate element M can range from 0-0.5. Substituted λ materials are made from, for example, the lithiated spinel (Li$_{1-y}$A$_v$)(Mn$_{1-x}$M$_x$)$_2$O$_{4-w}$AS$_t$. Some trace levels of lithium may remain after the formation of the lambda phase. For example, LiMn$_{1.75}$Ti$_{0.25}$O$_4$ may be converted to the λ phase Li$_{0.03}$(Mn$_{0.87}$Ti$_{0.13}$)O$_2$. This lambda phase has 20% more capacity/run-time than EMD. Theoretically, a λ-MnO$_2$ could improve the capacity of an electrochemical cell by as much as 100% compared to EMD.

The synthesis of λ-MnO$_2$ is a two-step process. The first step is a solid state reaction between manganese(III) oxide and lithium carbonate. The starting materials, in the correct stoichiometry, are intimately mixed and then heated at 850° C. for 16 hours. The resultant product is the spinel phase LiMn$_2$O$_4$. The LiMn$_2$O$_4$ is then suspended in an aqueous solution of 2.5M sulfuric acid for 16 hours at room temperature. This step leaches out most of the lithium, leaving a spinel Li$_z$MnO$_2$ (z<0.10). This is λ-MnO$_2$. If hot acid is used in the previous step, a different form of MnO$_2$ (gamma) is formed. However, with elemental substitution in the precursor (Li$_{1-y}$A$_v$)(Mn$_{1-x}$M$_x$)$_2$O$_{4-w}$AS$_t$, the hot acid step does not result in a phase change of the MnO$_2$; the λ structure is maintained. This material has slightly altered electrochemical properties from material that is treated with room temperature acid. Of primary interest is that the hetaerolite reaction is delayed, minimized or stopped. This change in response to the hetaerolite reaction results in greater capacity and run-time.

There may be substituted λ-MnO$_2$ which comprises more than one manganese substituent (alternate element). For example, a substituted λ-MnO$_2$ which comprises two alternate elements, M1 and M2, would have the formula (Li$_{1-y}$A$_v$)$_z$Mn$_{1-x-y}$M1$_x$M2$_y$O$_{2-(w/2)}$AS$_{(t/2)}$, wherein 0<(x+y)≤0.5, v≤0.1, z≤0.05, and t≤w≤0.2, and AS is S, F, N, or any element that can be isoelectronic to O$^{2-}$.

Further, λ-MnO$_2$ converts to a low voltage Birnessite phase upon discharge. This phase may be, for example, K$_{0.5}$Mn$_2$O$_4$•3(H$_2$O)$_{0.5}$. If the lambda structure can be maintained for a longer time, it will delay the formation of Birnessite, thereby adding additional runtime at a usable voltage. Any dopant (such as alternative element(s) as discussed herein) into the λ-MnO$_2$ that helps maintain the lambda structure during discharge, and thereby delay the onset of Birnessite formation will provide greater service or runtime than unsubstituted λ-MnO$_2$ on devices with functional endpoints of 1.0 V or above (e.g. 3 out of the 7 standard ANSI tests). Further, the Birnessite formation beyond one electron gives additional runtime for 4 out of the 7 ANSI tests with cutoff voltage of 0.9 V or 0.8 V.

In the examples that follow, it was unexpectedly found that electrochemical cells comprising substituted λ-MnO$_2$ in the cathode exhibited superior properties, such as specific capacity, compared to similar electrochemical cells comprising unsubstituted λ-MnO$_2$ or EMD in the cathode.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted.

In FIG. 1, an electrochemical cell 1 is shown, including a container or can 10 having a closed bottom end 24, a top end 22 and sidewall 26 therebetween. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is the preferred main active material for the negative electrode of the embodiments. Preferably, the volume of zinc utilized in the negative electrode is sufficient to maintain a desired particle-to-particle contact and a desired anode to cathode (A:C) ratio. The volume of zinc in the negative electrode can range from about 20 to about 30 volume percent, more preferably about 24 to about 28 volume percent. Notably, the solids packing of the negative electrode mix remains relatively unchanged from previously known designs, despite a lower overall concentration of zinc, because the relative volume contributions by the zinc and the zinc oxide are similar. The volume percent zinc is determined by dividing the volume of zinc by the volume of the negative electrode just prior to dispensing the negative electrode into the separator lined cavity as will be explained below. The volume percent zinc must be determined before dispensing the negative electrode into the separator basket because a portion of the electrolyte incorporated into the negative electrode migrates into the separator and cathode as soon as the negative electrode is inserted into the cavity defined by the separator. The volume percent zinc is based on the density of zinc (7.13 g/cc), the volume of the negative electrode mix and the weight of the negative electrode mix.

Particle-to-particle contact should be maintained during the useful life of the battery. If the volume of zinc in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged zinc particles, conductive electrochemically formed zinc oxide, or a combination thereof. A voltage drop can occur after zinc oxide has started to form, but before a sufficient network is built to bridge between all zinc particles present. Therefore, as the zinc reacts, eventually there is not enough zinc to form a continuous network, but there may not be enough zinc oxide to bridge the remaining zinc particles. As more electrochemical zinc oxide is formed, the conductive matrix can reform as zinc oxide is less dense than zinc and takes up more space, thereby bridging the zinc particles. If the voltage remains low, the cell must be replaced by the consumer. If the voltage quickly recovers to an acceptable value, the device may resume working in a normal manner. However, the consumer could incorrectly perceive that the temporary interruption in the device's performance is a sign that the battery is about to expire and may be motivated to replace the cell prematurely. Relatively higher concentrations of zinc can create reduction in the amounts of solid zinc oxide that can be utilized leading to reduced DSC (digital still camera) service, or gelled electrolyte leading to high viscosities and yield stresses causing negative electrode dispensing difficulties. Lower concentrations of zinc can cause lower service on substantially all rate tests due to the decreased presence of active material.

Zinc suitable for use in the embodiments may be purchased from a number of different commercial sources under various designations, such as BIA 100, BIA 115. Umicore, S. A., Brussels, Belgium is an example of a zinc supplier. In a preferred embodiment, the zinc powder generally has 25 to 40 percent fines less than 75 µm, and preferably 28 to 38 percent fines less than 75 µm. Generally lower percentages of fines will not allow desired DSC service to be realized and utilizing a higher percentage of fines can lead to increased gassing. A correct zinc alloy is needed in order to reduce negative electrode gassing in cells and to maintain test service results.

The amount of zinc present in the negative electrode ranges generally from about 62 to about 70 weight percent, desirably from about 64 to about 68 weight percent, and preferably about 65 to about, 66 weight percent based on the total weight of the negative electrode, i.e., zinc, solid zinc oxide, surfactant and gelled electrolyte.

Solid zinc oxide is present in the negative electrode of the embodiments. It has been found that the solid zinc oxide and water soluble block copolymer surfactant as described herein are synergists and significantly improve DSC service when compared to an electrochemical cell including a negative electrode without the solid zinc oxide and surfactant. The solid zinc oxide and surfactant do not appreciably impair relatively lower rate service, if at all. The solid zinc oxide is present in the negative electrode in an amount from about 1.5 to about 5 weight percent, and preferably from about 2 to about 3 weight percent based on the total weight of the negative electrode. The volume of solid zinc oxide is preferably from about 1 to about 2 volume percent based on the total volume of the negative electrode. A higher concentration of solid zinc oxide will increase high rate service, such as DSC service, but also increase negative electrode viscosity and yield stress which can create negative electrode dispensing problems. Lower concentrations of solid zinc oxide will decrease high rate DSC service.

The solid zinc oxide utilized in the embodiments is preferably highly active in order to increase high rate service, such as DSC service, as well as to increase anode rheology and reduce DSC service variability. The amount of active solid zinc oxide is generally greater than 90 percent and preferably greater than 95 percent based on the total weight of the solid zinc oxide present in the anode composition.

The solid zinc oxide added to the anode preferably has high purity and includes low levels of impurities that can result in higher zinc gassing and lowered service. The solid zinc oxide preferably contains less than 30 ppm iron, less than 3 ppm of silver and arsenic, less than 1 ppm of each of copper, nickel, chromium and cadmium, less than 0.50 ppm each of molybdenum, vanadium and antimony, less than 0.1 ppm tin and less than 0.05 ppm germanium.

A surfactant that is either a nonionic or anionic surfactant, or a combination thereof is present in the negative electrode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the surfactant reduces anode resistance increase caused by the addition of solid zinc oxide because the absorbed surfactant on solid zinc oxide results in enhanced surface charge density of solid zinc oxide particle surface. The higher the BET surface area of solid zinc oxide, the more surfactant can be adsorbed on the solid zinc oxide surface.

The preferred surfactant is DISPERBYK-190 from BYK-Chemie GmbH of Wesel, Germany. The surfactant is present in an amount sufficient to disperse the solid zinc oxide, preferably about 0.00064 to about 0.20 weight percent or more, based on the total weight of the negative electrode. DISPERBYK-190 is believed to be a solution including a water soluble, high molecular weight block copolymer including one or more functional groups, believably at least two different types of functional groups. The surfactant has an anionic/nonionic character due to the respective functional groups thereof. It is further believed that the number average molecular weight of a block copolymer DISPERBYK-190 is greater than 1000 measured utilizing gel permeation chromatography. Water solubility may be offset by the presence of a hydrophobic component if present in the electrode composition. In one embodiment, the surfactant is utilized in an amount from about 10 to about 100 ppm and preferably from about 15 to about 50 ppm of zinc utilized in the negative electrode. It is believed that DISPERBYK-190 does not contain any organic solvents and is, therefore, suitable for aqueous systems. DISPERBYK-190 has an acid value in mg KOH/g of 10 and a density of 1.06 g/ml at 20° C.

The aqueous alkaline electrolyte comprises an alkaline metal hydroxide such as potassium hydroxide, sodium hydroxide, or the like, or mixtures thereof. Potassium hydroxide is preferred. The alkaline electrolyte used to form the gelled electrolyte of the negative electrode contains the alkaline metal hydroxide in an amount from about 26 to about 36 weight percent, desirably from about 26 to about 32 weight percent, and preferably from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount or gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and preferably about 32 weight percent based on the total weight of the negative electrode. Volume percent of the gelled electrolyte is preferably about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining portion of the 29 weight percent KOH solution is injected into the separator lined cavity after the negative electrode has been inserted.

The negative electrode suitable for use in the embodiments after degassing has a negative electrode density generally from about 96 to 100 percent, preferably from about 98 to 100 percent, calculated by dividing the actual weight over actual volume by the theoretical weight over actual volume. The addition of the solid zinc oxide to the negative electrode provides for increased viscosity of the gelled negative electrode prior to addition to the cell. Negative electrode viscosity ranges generally from about 70,000 to about 100,000 cps, and preferably from about 70,000 to about 95,000 cps for an LR6 type cell. As negative electrode viscosity is relatively high when compared with other negative electrode mixes, processing conditions can be optimized, such as by reducing cell throughput or processing speed, balancing negative electrode dispensing rate, and nozzle pull-out rate, for example Pump size, piston outer diameter, and nozzle inner diameter as well as pump timing and pump stroke speed can influence dispensing of the negative electrode into the container. The weight of the negative electrode ranges generally from about 6 to about 7 grams, desirably from about 6.3 to about 6.7 grams, and preferably from about 6.37 to about 6.61 grams for an LR6 type cell.

Second electrode 12, also referred to herein as the positive electrode or cathode, includes substituted $\lambda$-$MnO_2$ as the electrochemically active material. Substituted $\lambda$-$MnO_2$ is present in an amount generally from about 80 to about 86 weight percent and preferably from about 81 to 85 weight percent by weight based on the total weight of the positive electrode, i.e., manganese dioxide, conductive material, positive electrode electrolyte and additives such as barium sulfate. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising substituted $\lambda$-$MnO_2$ and then inserting the rings into the container to form the tubular-shaped second electrode. The cell shown in FIG. 1 would typically include 3 or 4 rings.

The positive electrode can include other components such as a conductive material, for example graphite, that when mixed with the substituted $\lambda$-$MnO_2$ provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce substituted $\lambda$-$MnO_2$ input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component (substituted $\lambda$-$MnO_2$), conductive material, and barium sulfate are mixed together to form a homogeneous mixture. During the mixing process, an alkaline electrolyte solution, such as from about 37% to about 40% KOH solution, is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, as well as spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $\lambda\text{-MnO}_2$ in the positive electrode or cathode, the A:C ratio is preferably greater than 1.32:1, desirably greater than 1.34:1, and preferably 1.36:1 for impact molded positive electrodes. The A:C ratio for ring molded positive electrodes can be lower, such as about 1.2:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

Examples

Synthesis

The preparation of Tis1MDs (Ti-substituted lambda manganese dioxide) was performed via a three step process:
A) formation of the lithiated spinel by a solid state reaction,
B) delithiation with sulfuric acid at room temperature, followed by
C) treatment with fresh sulfuric acid at elevated temperature.

Step A: In one method, $Li_{1.00}Mn_{1.75}Ti_{0.25}O_4$ was the intended initial titanium-substituted spinel. The spinel was formed by reacting intimately mixed reagents of the correct stoichiometry of $Li_2CO_3$ (Alfa Aesar, 99%), $Mn_2O_3$ (Alfa Aesar, 98%)—and $TiO_2$ (Alfa Aesar, 99.9%) [or NTO, a niobium-substituted $TiO_2$ (as disclosed in U.S. Pat. No. 6,524,750) if incorporating Nip] with an agate mortar and pestle until a uniform color was achieved. The resulting charcoal gray powder was loaded into an alumina boat and heated in a box furnace at 850° C. for 16 hours. Heating and cooling ramp rates were 2-3° C./min. A black, cubic spinel product was obtained. Two materials made using step A were determined to be $Li_{1.078}Mn_{1.715}Ti_{0.207}O_4$ and $Li_{1.029}Mn_{1.757}Ti_{0.214}O_4$. The non-oxygen element content was normalized to three in these cases.

Step B: The step B and step C acid delithiation steps each utilized 2.5M $H_2SO_4$ (Fisher Scientific, Certified ACS Plus, 95-98% diluted appropriately with house deionized water). The room temperature acid treatment was performed at about 21° C. in an appropriately sized beaker. A 10:1 (170 mL acid to 17 g spinel) ratio of volume of 2.5M sulfuric acid to mass of spinel was utilized. The acid was stirred magnetically with a Teflon coated stirbar and the spinel was added to it as a free flowing powder. It was covered with a watch glass and allowed to stir for 16 hours at room temperature. Afterwards, the black solid was isolated by vacuum filtration and washed with deionized water until the filtrate pH is greater than 5.5. The solid is typically dried overnight at 60-70° C.

Step C: For the hot acid treatment, a 14:1 (126 mL acid to 9 g solid) or a 22.6:1 (158 mL acid to 7 g solid) ratio was used. Sulfuric acid (2.5M) is placed in a round bottom flask with a Teflon coated stirbar. A thermocouple probe is inserted into the acid through a side arm. A heating mantle is placed under the round bottom and a temperature controller is connected to the mantle and thermocouple. The free-flowing black solid is added to the flask and a cold water condenser attached. The temperature setpoint typically varied between 98 and 105° C. As measured against a mercury thermometer, the actual temperature appeared to be approximately 99° C. At these temperatures, the acid does not exhibit boiling. After 16 hours at temperature, the round bottom flask was allowed to cool. The black solid was isolated, washed and dried in an identical manner to the room temperature acid treatment step. Compositions are given in Tables 1-3; data is sorted by increasing capacity.

Electrochemical Testing

Low rate (10 mA/g) constant current discharge was utilized to ascertain the electrochemical quality of the lambda materials prepared. This measurement was performed on an Arbin test unit. The test vehicle was a flooded half cell. Typical cathode contents included 45 wt % active material, 45 wt % Timcal KS-6 graphite conductor and 10 wt % KOH (37 wt % KOH saturated with ZnO) as binder. The electrolyte used was also 37% KOH saturated with ZnO. The results may be seen below, in Tables 1-3.

TABLE 1

Reference materials

| Composition | Open Circuit Voltage (Volts) | Phase | Specific Capacity (mAh/g to 0.9 V) |
|---|---|---|---|
| EMD | 1.584 | Commercial grade | 272 |
| $\lambda$-MnO$_2$ | 1.620 | Lambda | 334 |

TABLE 2

Ti-substituted Lambda Phases

| Composition | Open Circuit Voltage (Volts) | Phase | Specific Capacity (mAh/g to 0.9 V) |
|---|---|---|---|
| Li$_{0.01}$(Mn$_{0.81}$Ti$_{0.19}$)O$_2$ | 1.628 | Lambda | 267 |
| Li$_{0.06}$(Mn$_{0.87}$Ti$_{0.03}$)O$_2$ | 1.587 | Lambda + gamma | 318 |
| Li$_{0.03}$(Mn$_{0.87}$Ti$_{0.13}$)O$_2$ | 1.551 | Lambda | 321 |
| Li$_{0.04}$(Mn$_{0.86}$Ti$_{0.14}$)O$_2$ | 1.563 | Lambda | 324 |
| Li$_{0.04}$(Mn$_{0.89}$Ti$_{0.11}$)O$_2$ | 1.535 | Lambda + gamma | 326 |
| Li$_{0.06}$(Mn$_{0.98}$Ti$_{0.02}$)O$_2$ | 1.651 | Lambda + gamma | 341 |
| Li$_{0.05}$(Mn$_{0.95}$Ti$_{0.05}$)O$_2$ | 1.631 | Lambda | 343 |
| Li$_{0.02}$(Mn$_{0.95}$Ti$_{0.05}$)O$_2$ | 1.517 | Lambda + gamma | 354 |

TABLE 3

Ti/Nb-substituted Lambda Phases

| Composition | Open Circuit Voltage (Volts) | Phase | Specific Capacity (mAh/g to 0.9 V) |
|---|---|---|---|
| Li$_{0.04}$(Mn$_{0.87}$Ti$_{0.12}$Nb$_{0.01}$)O$_2$ | 1.563 | Lambda | 316 |
| Li$_{0.05}$(Mn$_{0.87}$Ti$_{0.12}$Nb$_{0.01}$)O$_2$ | 1.537 | Lambda | 322 |
| Li$_{0.02}$(Mn$_{0.90}$Ti$_{0.09}$Nb$_{0.01}$)O$_2$ | 1.622 | Lambda | 323 |
| Li$_{0.03}$(Mn$_{0.91}$Ti$_{0.08}$Nb$_{0.01}$)O$_2$ | 1.662 | Lambda | 328 |
| Li$_{0.03}$(Mn$_{0.91}$Ti$_{0.08}$Nb$_{0.01}$)O$_2$ | 1.59 | Lambda | 328 |
| Li$_{0.03}$(Mn$_{0.95}$Ti$_{0.04}$Nb$_{0.01}$)O$_2$ | 1.702 | Lambda | 329 |
| Li$_{0.03}$(Mn$_{0.97}$Ti$_{0.03}$Nb$_{0.01}$)O$_2$ | 1.608 | Lambda | 329 |
| Li$_{0.03}$(Mn$_{0.94}$Ti$_{0.05}$Nb$_{0.01}$)O$_2$ | 1.537 | Lambda | 335 |
| Li$_{0.02}$(Mn$_{0.99}$Ti$_{0.007}$Nb$_{0.002}$)O$_2$ | 1.624 | Lambda + gamma | 338 |
| Li$_{0.02}$(Mn$_{0.94}$Ti$_{0.05}$Nb$_{0.01}$)O$_2$ | 1.568 | Lambda | 338 |
| Li$_{0.03}$(Mn$_{0.94}$Ti$_{0.05}$Nb$_{0.01}$)O$_2$ | 1.618 | Lambda | 339 |
| Li$_{0.05}$(Mn$_{0.94}$Ti$_{0.05}$Nb$_{0.01}$)O$_2$ | 1.536 | Lambda | 340 |
| Li$_{0.04}$(Mn$_{0.95}$Ti$_{0.05}$Nb$_{0.01}$)O$_2$ | 1.571 | Lambda | 341 |
| Li$_{0.03}$(Mn$_{0.94}$Ti$_{0.05}$Nb$_{0.01}$)O$_2$ | 1.554 | Lambda | 345 |
| Li$_{0.03}$(Mn$_{0.94}$Ti$_{0.05}$Nb$_{0.01}$)O$_2$ | 1.579 | Lambda | 359 |

As Tables 1-3 show, there were cells comprising $\lambda$-MnO$_2$ with Ti added, as well as cells comprising $\lambda$-MnO$_2$ with Ti and Nb added, which improved the specific capacity compared to standard $\lambda$-MnO$_2$.

Figure 2:
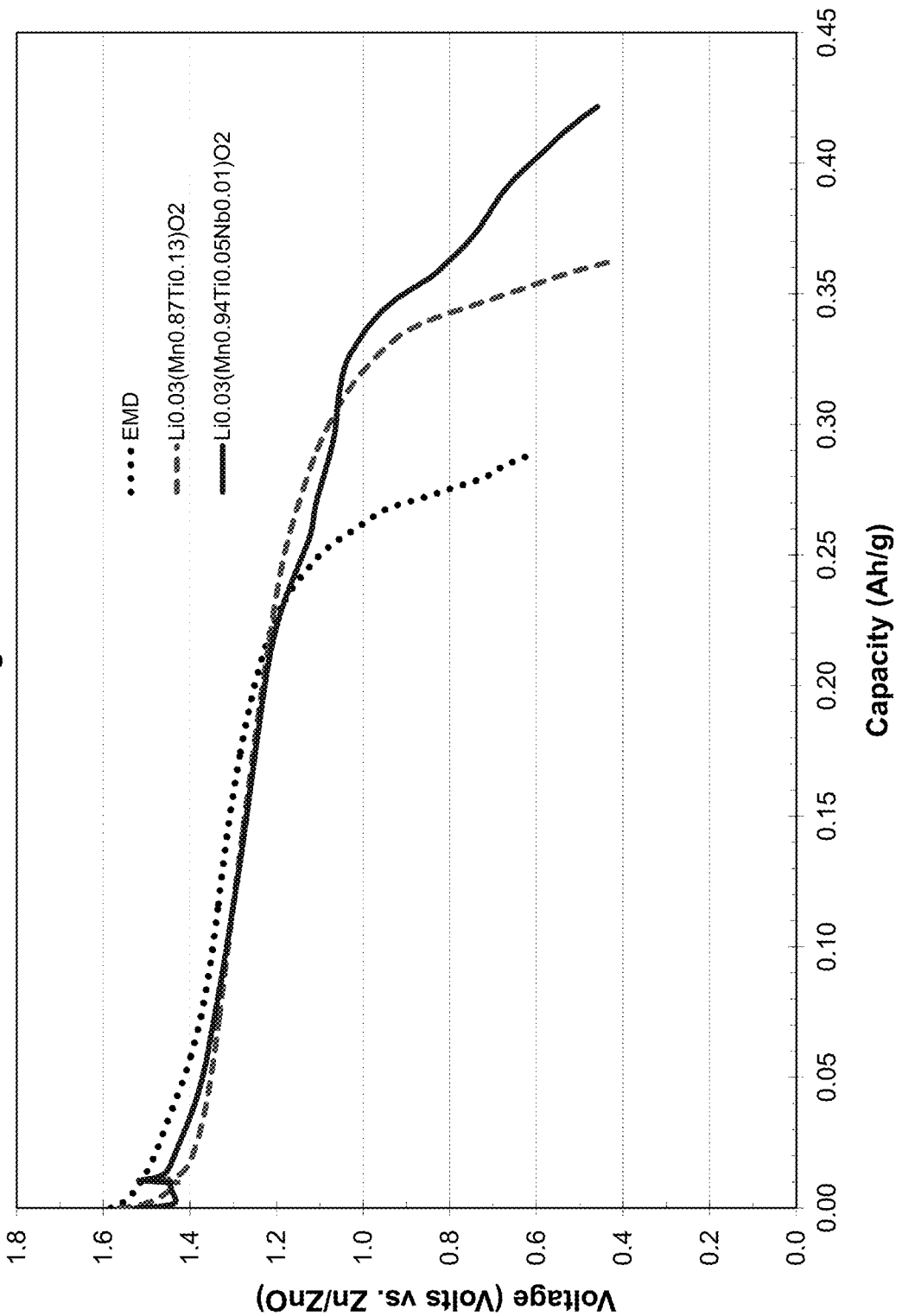
FIG. 2 is a graph showing discharge behavior of Ti- and Ti/Nb-substituted λ-$MnO_2$ in comparison with that of EMD in a non-aqueous electrolyte.

Certain substituted $\lambda$-MnO$_2$s listed in the tables above, monosubstituted [Li$_{0.03}$(Mn$_{0.87}$Ti$_{0.13}$)O$_2$] and disubstituted [Li$_{0.03}$(Mn$_{0.94}$Ti$_{0.05}$Nb$_{0.01}$)O$_2$], had their discharge compared to that of EMD; the results are shown in FIG. 2. The horizontal axis is expressed in ampere-hours per gram, allowing the normalization of the curves for differing sample weights. The vertical axis shows the cell voltages during discharge. The resulting discharge curves show that the substituted $\lambda$-MnO$_2$ s each operated at a similar voltage during the discharge, but had higher total ampere-hour capacity than the EMD. The disubstituted $\lambda$-MnO$_2$ (comprising both Ti and Nb) had a higher total ampere-hour capacity than the monosubstituted $\lambda$-MnO$_2$ (comprising Ti, but not Nb).

In another example, aluminum-substituted lambda manganese dioxide was prepared. The precursor spinel, Li(Mn$_{1.78}$Al$_{0.22}$)O$_{3.98}$S$_{0.02}$, was synthesized using a procedure documented by Y-K. Sun et al. (*Electrochemical and Solid-State Letters*, 3(1), 7-9 (2000)), which is hereby incorporated by reference in its entirety. The spinel was then delithiated in order to convert it to the lambda phase using identical room temperature and acid condition documented in Step B, in connection with the Ti and Ti/Nb-substituted spinels, discussed hereinabove. The lambda phase composition (excluding oxygen) was determined by ICP-AES to be Li$_{0.12}$(Mn$_{0.89}$Al$_{0.11}$)O$_{1.99}$S$_{0.01}$. X-ray diffraction confirmed the lambda structure. Electrochemical testing of Li$_{0.12}$(Mn$_{0.89}$Al$_{0.11}$)O$_{1.99}$S$_{0.01}$ was performed in the same manner as was performed in connection with the Ti and Ti/Nb-substituted spinels, discussed hereinabove. An open circuit voltage of 1.504V was measured with a discharge capacity of 292 mAh/g when tested at 10 mA/g.

In another example, lambda phase starting from a spinel with multi-element alkali metal was synthesized. The targeted spinel was (Li$_{0.99}$Na$_{0.01}$)Mn$_2$O$_4$. It was synthesized by adapting a documented procedure from Sun et al. (2000), referenced hereinabove. This spinel was then dealkylated in order to convert it to the lambda phase using identical room temperature and acid condition documented in Step B, in connection with the Ti and Ti/Nb-substituted spinels, discussed hereinabove. X-ray diffraction confirmed the lambda structure and no other sodium impurity phases were present.

Solubility/Stability Testing

Figure 3:
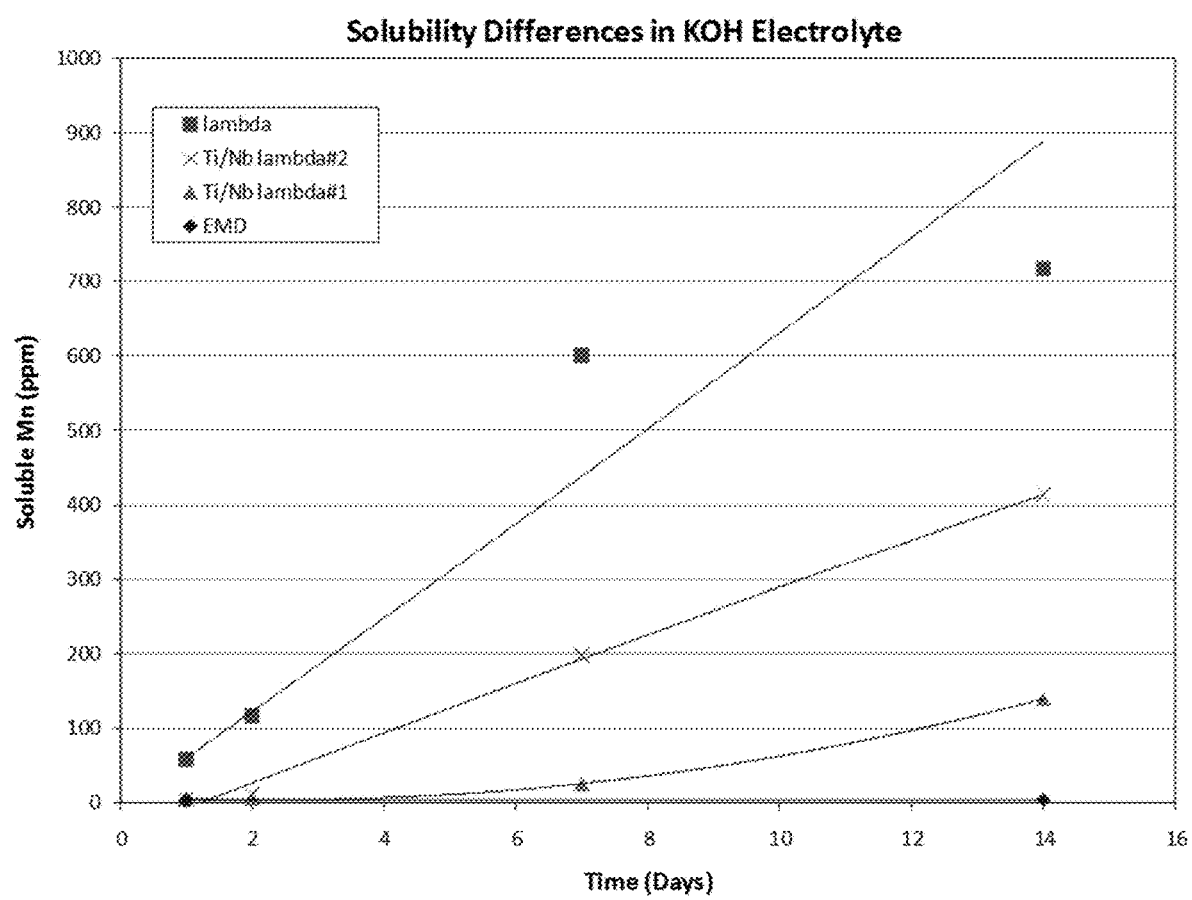
FIG. 3 shows the solubility of two Ti/Nb-substituted λ-$MnO_2$ compositions compared to λ-$MnO_2$ and EMD.

Stability studies in aqueous alkaline electrolyte utilized 37 wt % KOH saturated with ZnO. In this testing, 0.5 g of solid $\lambda$-MnO$_2$ was added to 5 mL of 37 wt % KOH saturated with ZnO. They were stored in capped polyethylene vials for various lengths of time. Sample solutions were analyzed for soluble manganese content. The results of the solubility testing may be seen in FIG. 3. Ti/Nb lambda #1 has the formula Li$_{0.02}$(Mn$_{0.09}$Ti$_{0.09}$Nb$_{0.01}$)O$_2$, and Ti/Nb lambda #2 has the formula Li$_{0.03}$(Mn$_{0.94}$Ti$_{0.05}$Nb$_{0.01}$)O$_2$. Their solubilities are shown compared to those of unsubstituted $\lambda$-MnO$_2$ and EMD.

X-ray Diffraction

X-ray diffraction data was obtained for $\lambda$-Li$_{0.03}$(Mn$_{0.94}$Ti$_{0.05}$Nb$_{0.01}$)O$_2$, as well as its precursor, Li(Mn$_{1.88}$Ti$_{0.10}$Nb$_{0.02}$)O$_4$. The peak data may be seen in Table 4, below. For the sake of comparison, Joint Committee on Powder Diffraction Standards (JCPDS) X-ray diffraction data is included for $\lambda$-MnO$_2$ and its precursor, LiMn$_2$O$_4$.

TABLE 4

X-ray Diffraction Two Theta Values (degrees) Cu K$\alpha$ radiation

| h k l | LiMn$_2$O$_4$ JCPDS #35-782 | $\lambda$-MnO$_2$ JCPDS #44-992 | Li(Mn$_{1.88}$Ti$_{0.10}$Nb$_{0.02}$)O$_4$ | $\lambda$-Li$_{0.03}$(Mn$_{0.94}$Ti$_{0.05}$Nb$_{0.01}$)O$_2$ |
|---|---|---|---|---|
| 1 1 1 | 18.615 | 19.117 | 18.679 | 19.160 |
| 0 2 2 | 30.642 | — | 30.680 | — |

TABLE 4-continued

X-ray Diffraction Two Theta Values (degrees) Cu Kα radiation

| h k l | $LiMn_2O_4$ JCPDS #35-782 | $\lambda\text{-}MnO_2$ JCPDS #44-992 | $Li(Mn_{1.88}Ti_{0.10}Nb_{0.02})O_4$ | $\lambda\text{-}Li_{0.03}(Mn_{0.94}Ti_{0.05}Nb_{0.01})O_2$ |
|---|---|---|---|---|
| 3 1 1 | 36.087 | 37.131 | 36.156 | 37.104 |
| 2 2 2 | 37.745 | 38.955 | 37.802 | 38.800 |
| 0 0 4 | 43.862 | 45.073 | 43.922 | 45.079 |
| 1 3 3 | 48.052 | 49.496 | 48.084 | 49.401 |
| 1 1 5 | 58.051 | 59.610 | 58.117 | 59.759 |
| 0 4 4 | 63.776 | 65.716 | 63.837 | 65.640 |
| 3 1 5 | 67.081 | 69.581 | 67.119 | not measured |

Discharge and Birnessite formation

Figure 4:
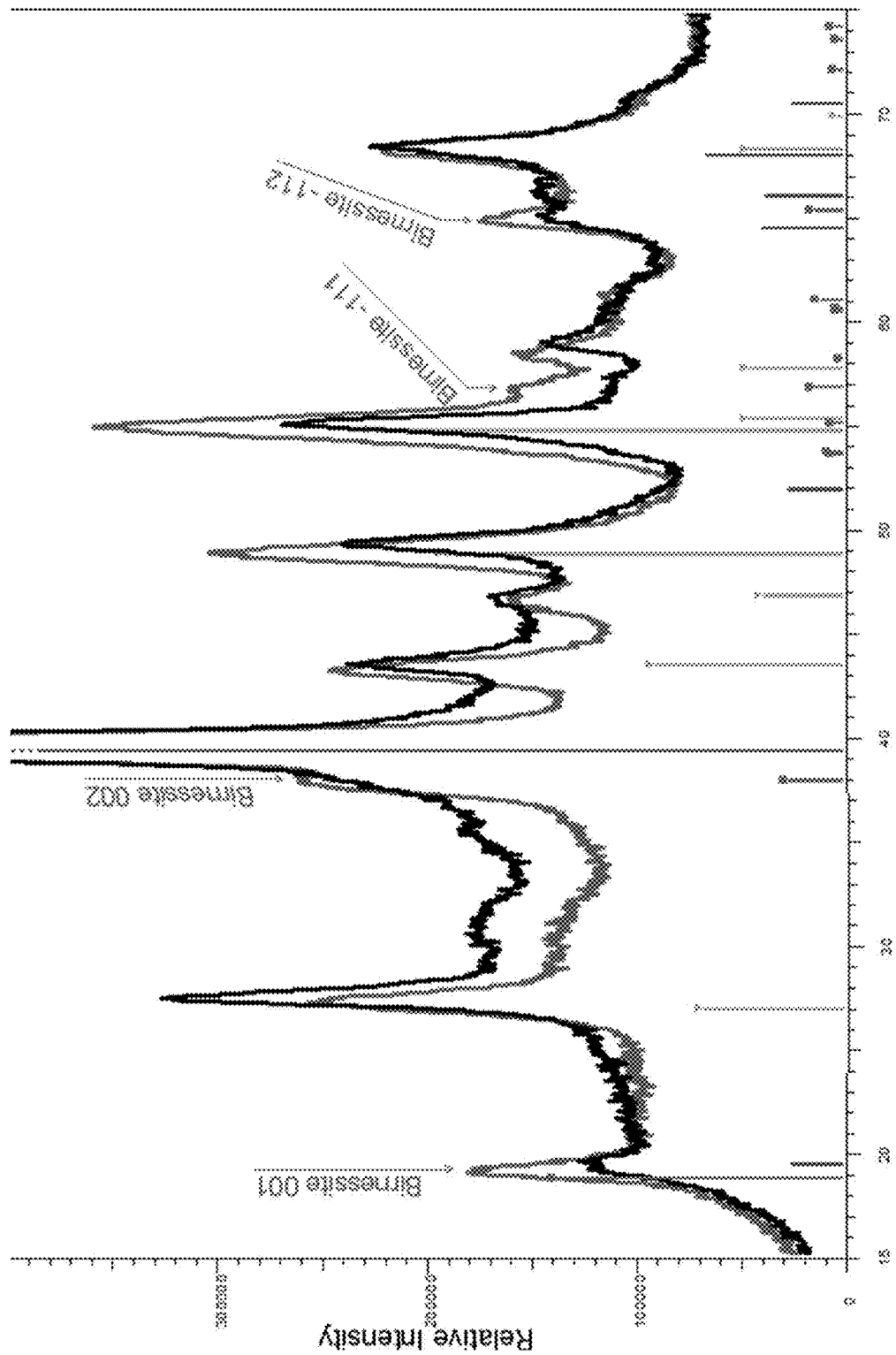
FIG. 4 shows X-ray diffraction data for a substituted and unsubstituted λ-$MnO_2$ discharged to approximately one electron per Mn. The most intense carbon peak has been cut off so that all peaks are easily visible. The lighter intensity line is unsubstituted λ-$MnO_2$, showing Birnessite formation, and the darker intensity line is Ti/Nb-substituted λ-$MnO_2$, showing minimized or no Birnessite formation. The square-topped lines are from Birnessite, the triangle-topped lines are from $Mn_3O_4$, and the lines with no top are from conductive carbon (KS-6).

In order to better understand the discharge mechanism, half-cells (i.e. cathode only) were made and discharged at 10 mA/g, for both unsubstituted $\lambda\text{-}MnO_2$ and substituted $\lambda\text{-}MnO_2$ having the formula $Li_{0.032}(Mn_{0.957}Ti_{0.037}Nb_{0.006})O_2$. The half-cells were tested with electrolyte both with and without ZnO. Discharges were stopped at two different depths of discharge, equating to about 1 and 1.3 electrons per Mn. The electrodes were then washed free of electrolyte, dried and analyzed by X-ray diffraction to identify the crystalline discharge products. The X-ray diffraction data may be seen in FIG. 4 for select scenarios. The results show that Birnessite was present in the discharge products of unsubstituted $\lambda\text{-}MnO_2$, but not in the substituted $\lambda\text{-}MnO_2$. "Birnessite 001," "Birnessite 002," "Birnessite-111," and "Birnessite-112" represent peaks caused by Birnessite, and these peaks are present in the X-ray diffraction data from the unsubstituted $\lambda\text{-}MnO_2$, but not in the substituted $\lambda\text{-}MnO_2$.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments.

What is claimed is:

1. Substituted $\lambda\text{-}MnO_2$, having at least one alternate element substituted for a portion of the Mn;
   wherein the substituted $k\text{-}MnO_2$ has the formula $(Li_{1-v}A_v)_z(Mn_{1-x}M_x)O_{2-(w/2)}AS_{(t/2)}$, wherein $0 < x \le 0.5$, $v \le 0.1$, $0 < z \le 0.10$, and $t \le w \le 0.2$, wherein M is the at least one alternate element, wherein A is an alkali metal, and wherein AS is S, F, N, or any element that can be isoelectronic to $O^{2-}$; or
   wherein the substituted $\lambda\text{-}MnO_2$ has the formula $(Li_{1-v}A_v)_z(Mn_{1-x-y}M1_xM2_y)O_{2-(w/2)}AS_{(t/2)}$, wherein $0 < (x+y) \le 0.5$, $v \le 0.1$, $0 < z \le 0.10$, and $t \le w \le 0.2$, wherein M1 and M2 are each an alternate element, wherein M1 is different from M2, wherein A is an alkali metal, and wherein AS is S, F, N, or any element that can be isoelectronic to $O^{2-}$.

2. The substituted $\lambda\text{-}MnO_2$ of claim 1, wherein $z < 0.05$.

3. The substituted $\lambda\text{-}MnO_2$ of claim 1, wherein the at least one alternate element is selected from the group consisting of Al, B, Co, Cr, Cu, Fe, Ga, Li, Nb, Ni, Mg, Ru, Ti, V, and Zn, and A is selected from the group consisting of Na, K, Rb, and Cs.

4. The substituted $\lambda\text{-}MnO_2$ of claim 1, wherein the at least one alternate element can exist in an octahedral coordination environment of oxygen, supports M-O bonds of about 1.8 to 2.2 Å, and has an oxidation state that allows charge neutrality of the $\lambda\text{-}MnO_2$.

5. A primary alkaline electrochemical cell comprising a cathode comprising the substituted $\lambda\text{-}MnO_2$ of claim 1, wherein the substituted $\lambda\text{-}MnO_2$ comprises two alternate elements, and wherein the electrochemical cell exhibits a synergistic improvement in specific capacity or runtime compared to an electrochemical cell comprising a cathode comprising unsubstituted $\lambda\text{-}MnO_2$.

6. A primary alkaline electrochemical cell, comprising:
   a) a container; and
   b) an electrode assembly disposed within the container and comprising a positive electrode, a negative electrode, a separator located between the positive electrode and the negative electrode, and an alkaline electrolyte,
   wherein the negative electrode comprises zinc, and
   wherein the positive electrode comprises the substituted $\lambda\text{-}MnO_2$ of claim 1.

7. The primary alkaline electrochemical cell of claim 6, wherein the specific capacity or runtime is greater than that of a similar primary alkaline electrochemical cell comprising unsubstituted $\lambda\text{-}MnO_2$ or EMD in its positive electrode.

8. The primary alkaline electrochemical cell of claim 6, wherein the specific capacity is between 267-359 (mAh/g to 0.9V), or between 285-350 (mAh/g to 0.9V), or between 295-340 (mAh/g to 0.9V), or between 305-335 (mAh/g to 0.9V), or between 315-330 (mAh/g to 0.9V), or between 320-325 (mAh/g to 0.9V).

9. The primary alkaline electrochemical cell of claim 6, wherein during discharge, formation of Birnessite is delayed, reduced, or eliminated compared to the formation of Birnessite during discharge of a similar primary alkaline electrochemical cell comprising unsubstituted $\lambda\text{-}MnO_2$ or EMD in its positive electrode.

10. The substituted $\lambda\text{-}MnO_2$ of claim 1, wherein the substituted $\lambda\text{-}MnO_2$ comprises the alkali metal.

11. The substituted $\lambda\text{-}MnO_2$ of claim 1, wherein the substituted $\lambda\text{-}MnO_2$ comprises oxygen vacancies.

12. The substituted $\lambda\text{-}MnO_2$ of claim 1, wherein the substituted $\lambda\text{-}MnO_2$ comprises at least one anion substituent.

13. A method of producing a substituted $\lambda\text{-}MnO_2$, comprising the step of suspending a composition having the chemical formula $(Li_{1-v}A_v)Mn_{2-2x}M_{2x})O_{4-w}AS_t$ in aqueous sulfuric acid, so as to produce a substituted λ-MnO$_2$ having the formula $(Li_{1-v}A_v)_z(Mn_{1-x}M_x)O_{2-(w/2)}AS_{(t/2)}$, wherein 0<x≤0.5, v≤0.1, 0≤z≤0.05, and t≤w≤0.2; and wherein M is selected from the group consisting of Al, B, Co, Cr, Cu, Fe, Ga, Li, Nb, Ni, Mg, Ru, Ti, V, and Zn, A is selected from the group consisting of Na, K, Rb, and Cs, and AS is selected from the group consisting of S, F, and N.

14. The method of claim 13, further comprising a step of producing the $(Li_{1-v}A_v)(Mn_{2-x}M_{2x})O_{4-w}AS_t$ by reacting $Li_2CO_3$, $A_2CO_3$ if A is present, $Mn_2O_3$, $O_2$, a compound comprising M, and a compound comprising AS if AS is present, in appropriate stoichiometric ratios, at about 850° C.

15. A substituted λ-MnO$_2$ produced by the method of claim 13.

16. A primary alkaline electrochemical cell, comprising:
a) a container; and
b) an electrode assembly disposed within the container and comprising a positive electrode, a negative electrode, a separator located between the positive electrode and the negative electrode, and an alkaline electrolyte, wherein the positive electrode comprises substituted λ-MnO$_2$ produced by the method of claim 13.

17. A method of producing a substituted λ-MnO$_2$, comprising the step of suspending a composition having the chemical formula $(Li_{1-v}A_v)(Mn_{2-2x-2y}M1_{2x}M2_{2y})O_{4-w}AS_t$ in aqueous sulfuric acid, so as to produce a substituted λ-MnO$_2$ having the formula

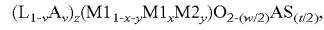

wherein 0<(x+y)≤0.5, v≤0.1, 0≤z≤0.05, and t≤w≤0.2; and wherein M1 and M2 are different from each other and are each selected from the group consisting of Al, B, Co, Cr, Cu, Fe, Ga, Li, Nb, Ni, Mg, Ru, Ti, V, and Zn, A is selected from the group consisting of Na, K, Rb, and Cs, and AS is S, F, N, or any element that can be isoelectronic to $O^{2-}$.

* * * * *

UNITED STATES PATENT AND TRADEMARK OFFICE
CERTIFICATE OF CORRECTION

PATENT NO. : 10,804,536 B2  
APPLICATION NO. : 15/895546  
DATED : October 13, 2020  
INVENTOR(S) : Schimek et al.

Page 1 of 1

It is certified that error appears in the above-identified patent and that said Letters Patent is hereby corrected as shown below:

In the Claims

Column 19  
Line 52, Claim 1, "wherein the substituted k-MnO$_2$" should read --wherein the substituted λ-MnO$_2$--  
Line 65, Claim 2, "z<0.05" should read --z ≤ 0.05--

Column 20  
Line 66, Claim 13, "(Li$_{1-v}$A$_v$)Mn$_{2-2x}$M$_{2x}$)O$_{4-w}$AS$_t$" should read --(Li$_{1-v}$A$_v$)(Mn$_{2-2x}$M$_{2x}$)O$_{4-w}$AS$_t$--

Column 21  
Line 3, Claim 13, "wherein 0 < x ≤ 0.5, v ≤ 0.1, 0 ≤ z ≤ 0.05" should read --wherein 0 < x ≤ 0.5, v ≤ 0.1, 0 < z ≤ 0.05--

Column 22  
Line 11, Claim 17, "(L$_{1-v}$A$_v$)$_z$(M1$_{1-x-y}$M1$_x$M2$_y$)O$_{2-(w/2)}$AS$_{(t/2)}$" should read --(Li$_{1-v}$A$_v$)$_z$(Mn$_{1-x-y}$M1$_x$M2$_y$)O$_{2-(w/2)}$AS$_{(t/2)}$,--  
Line 12, Claim 17, "wherein 0 < (x+y) ≤ 0.5, v ≤ 0.1, 0 ≤ z ≤ 0.05" should read --wherein 0 < (x+y) ≤ 0.5, v ≤ 0.1, 0 < z ≤ 0.05--

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*